Figure 1:
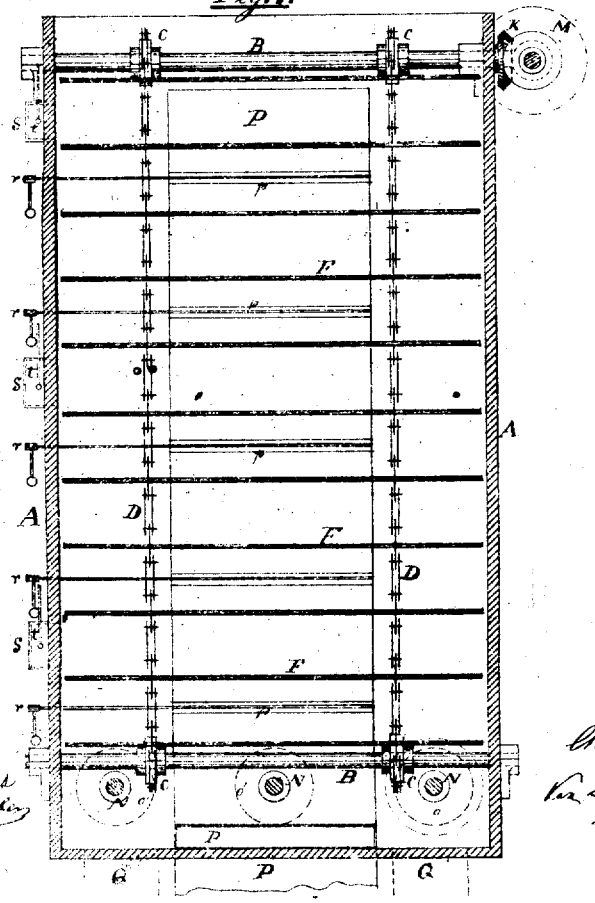

2 Sheets--Sheet 1

C. ALDEN.

Improvement in Apparatus for Drying and Evaporating.

No. 4,011. Reissued June 7, 1870.

Witnesses:
C. Wahlers
E. F. Kastenhuber

Charles Alden
per
Van Santvoord & Hoff
Attys

C. ALDEN.
Improvement in Apparatus for Drying and Evaporating.
No. 4,011.
Reissued June 7, 1870.
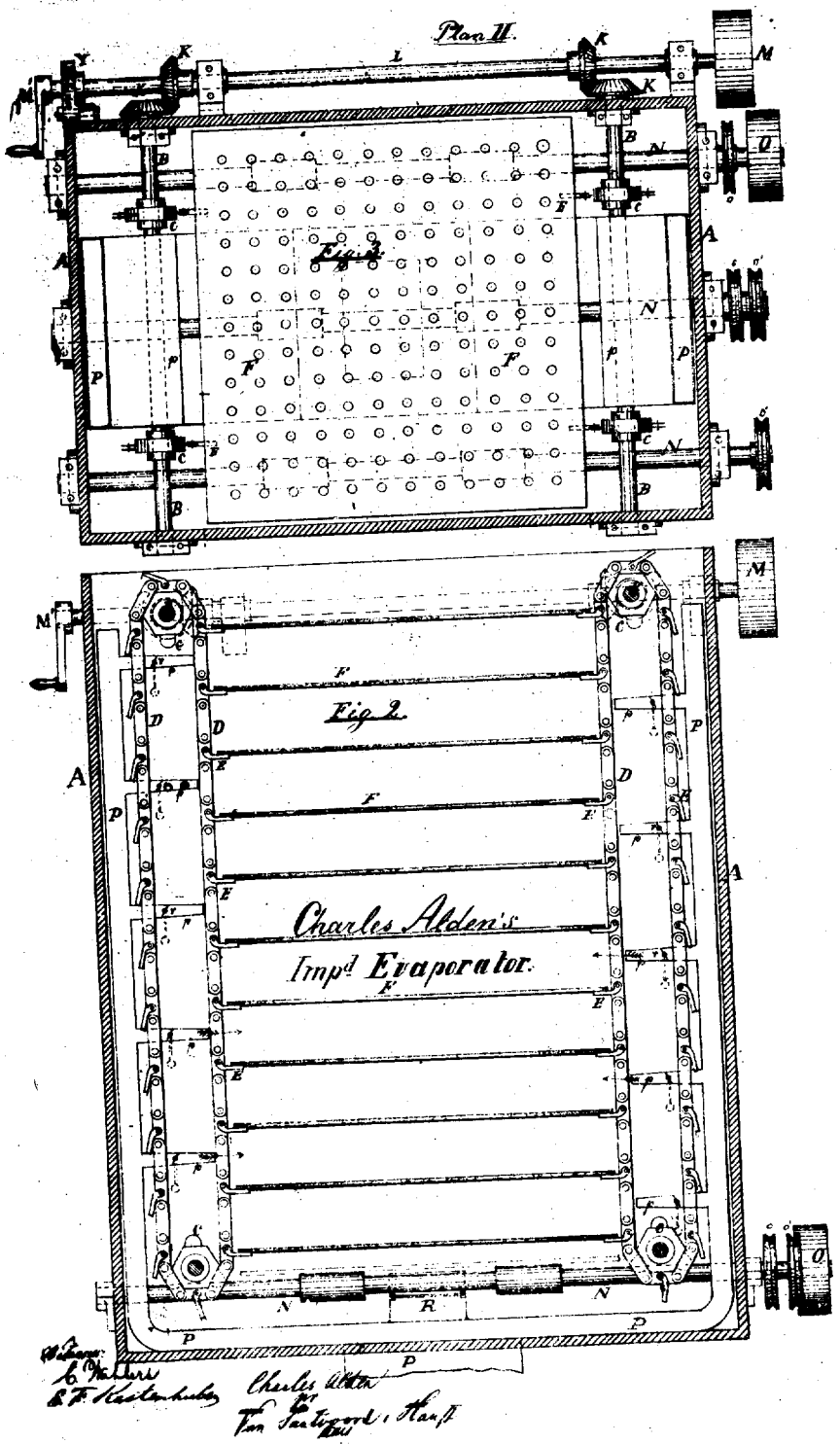
Witnesses:
L. Walters
B. F. Kastenhuber
Charles Alden
Per Geo. Sautwood, Atty.

UNITED STATES PATENT OFFICE.

CHARLES ALDEN, OF NEWBURG, FOR HIMSELF AND ALDEN FRUIT-PRESERVING COMPANY, OF NEW YORK, N. Y., ASSIGNEES OF CHARLES ALDEN.

IMPROVEMENT IN PROCESS FOR EVAPORATING THE MOISTURE FROM ANIMAL AND VEGETABLE SUBSTANCES.

Specification forming part of Letters Patent No. 100,835, dated March 15, 1870; reissue No. 4,011, dated June 7, 1870.

DIVISION B.

*To all whom it may concern:*

Be it known that CHARLES ALDEN, of Newburg, in the county of Orange and State of New York, did invent a new and Improved Process for Evaporating the Moisture from Animal and Vegetable Substances; and the following is hereby declared to be a full, clear, and exact description thereof, which will enable those skilled in the art to make and use the same, reference being had to the accompanying drawing forming part of this specification, in which drawing—

Figure 1 represents a transverse vertical section of the apparatus which may be used in carrying out this invention. Fig. 2 is a longitudinal vertical section of the same. Fig. 3 is a horizontal section of the same.

Similar letters indicate corresponding parts.

This invention consists in evaporating the moisture from vegetable and animal substances by exposing the same first to a comparatively low temperature, and to currents of rarefied air of little force, and then advancing them gradually toward a higher temperature, and to currents of air of an increased force and rarefaction, in such a manner that the articles from which the moisture is to be evaporated are gradually expanded, and the moisture is rapidly and completely expelled without changing the nature of the articles under treatment.

In carrying out this invention, the substances from which the moisture is to be evaporated are spread upon platforms F, which are placed one above the other in the interior of a trunk or chamber, A, and which may be made to rest on supports E, secured to endless chains D D, which run over chain-wheels C C, mounted on shafts B B, having their bearings on the side walls of the trunk or chamber. Said platforms are perforated with small holes to allow a free circulation of the air, and, if the chain-wheels are caused to revolve, a rising or falling motion is imparted to the platforms. The motion of the chain-wheels is derived from the driving-shaft L, which is driven either by a hand-crank, M′, or by a pulley, M, said shaft being connected with the chain-shafts B B by means of gear-wheels K and a stop-pawl, Z, which, engaging with a ratchet-wheel, Y, mounted on the driving-shaft L, serves to arrest the chains at any desired point. The chain-wheels C C at the bottom of the trunk are driven simply by the chains, and, if the trunk is high, the chains are steadied by intermediate guide-rollers. Each of the platforms on reaching the bottom of the trunk is deposited upon the conveyer N, which receives motion by a pulley, O, and small belt-wheels *o o′*, and by this conveyer the successive platforms are carried out of the trunk, so that they can be readily removed and again introduced at the top of the trunk. On the sides of the trunk are arranged two air-chambers, P P, which are supplied with hot or cold air from below, and which are provided with nozzles *p* for the discharge of the air. By these means currents of hot or cold air are thrown over or between the platforms, and these currents are regulated by dampers *r*. If hot air is used, suitable thermometers *t* may be applied in boxes S, attached to the sides of the trunk, to indicate the temperature of the air therein. Suitable flues Q Q may be applied to introduce currents of cold air into the trunk to regulate the temperature, if desired.

The articles or materials from which the moisture is to be evaporated are placed upon the platforms, which are arranged in the trunk or chamber one above the other, where said articles are exposed to the currents of air injected through the nozzles *p*, and as said currents passs over, through, and around the articles or substances spread upon the platforms the moisture contained in said articles is rapidly carried off. This effect is materially facilitated by injecting into the trunk currents of heated rarefied air, and by imparting to the platforms a slow downward motion in the trunk, as above stated. By the action of the heated rarefied air the substances from which the moisture is to be evaporated are expanded, and the moisture is rapidly expelled; and if the platforms on which said substances are spread have a slow downward motion, the effect of the heated rarefied air is still further increased, since the substances, on being introduced at the top of the trunk, reduce the temperature of the currents of air, and at the same time said currents have less force than they have at the bottom of the trunk; and, as the platforms descend, the substances spread thereon are gradually advanced toward a higher temperature and to currents of air of increased force and rarefaction, and the process of evaporating the moisture, particularly from fruits or vegetables, can be effected with a success not obtained by any other known process.

What is claimed as new, and desired to be secured by Letters Patent, is—

The process of evaporating the moisture from vegetable and animal substances by exposing the same first to a comparatively low temperature, and to currents of rarefied air of little force, and then advancing them gradually toward a higher temperature and to currents of air of an increased force and rarefaction, as specified.

CHARLES ALDEN.
A. D. DICKINSON,
*President.*

Witnesses:
W. HAUFF,
C. WAHLERS.